(12) United States Patent
Mackulin et al.

(10) Patent No.: US 6,710,482 B2
(45) Date of Patent: Mar. 23, 2004

(54) GENERATOR

(75) Inventors: Bryan J Mackulin, Akron, OH (US); Todd A Travers, Macedonia, OH (US); John R Karabinus, Hudson, OH (US)

(73) Assignee: Lucas Aerospace Power Equipment Corporation, OH (US)

( * ) Notice: Subject to any disclaimer, the term of this patent is extended or adjusted under 35 U.S.C. 154(b) by 0 days.

(21) Appl. No.: 10/226,948

(22) Filed: Aug. 23, 2002

(65) Prior Publication Data

US 2003/0127930 A1 Jul. 10, 2003

(30) Foreign Application Priority Data

Aug. 25, 2001 (GB) ............................................. 0120748

(51) Int. Cl.$^7$ ................................................. H02K 7/10
(52) U.S. Cl. .................... 310/75 R; 310/75 D; 310/79; 310/80; 310/89; 310/118
(58) Field of Search ............................. 310/75 R, 75 D, 310/79, 80, 83, 85, 89, 113, 118, 120, 121, 105

(56) References Cited

U.S. PATENT DOCUMENTS

| | | | |
|---|---|---|---|
| 3,826,937 A | * | 7/1974 | Davies ........................ 310/105 |
| 3,938,007 A | | 2/1976 | Boniger et al. |
| 3,956,671 A | | 5/1976 | Nimmersjo |
| 4,001,742 A | | 1/1977 | Jencks et al. |
| 4,034,245 A | * | 7/1977 | Mailfert et al. ................ 310/52 |
| 4,245,318 A | | 1/1981 | Eckart et al. |
| 4,291,299 A | | 9/1981 | Hinz et al. |
| 4,301,433 A | | 11/1981 | Castonguay et al. |
| 4,415,968 A | | 11/1983 | Maeda et al. |
| 4,423,459 A | | 12/1983 | Stich et al. |
| 4,432,031 A | | 2/1984 | Premerlani |
| 4,455,612 A | | 6/1984 | Girgis et al. |
| 4,468,714 A | | 8/1984 | Russell |
| 4,589,074 A | | 5/1986 | Thomas et al. |
| 4,623,949 A | | 11/1986 | Salowe et al. |
| 4,631,625 A | | 12/1986 | Alexander et al. |
| 4,642,724 A | | 2/1987 | Ruta |
| 4,649,307 A | * | 3/1987 | Bech ........................... 310/99 |
| 4,651,066 A | * | 3/1987 | Gritter et al. ................ 318/139 |
| 4,652,966 A | | 3/1987 | Farag et al. |
| 4,661,734 A | * | 4/1987 | Capuano et al. .............. 310/89 |
| 4,672,501 A | | 6/1987 | Bilac et al. |
| 4,672,555 A | | 6/1987 | Hart et al. |
| 4,674,062 A | | 6/1987 | Premerlani |
| 4,689,712 A | | 8/1987 | Demeyer |
| 4,709,339 A | | 11/1987 | Fernandes |
| 4,751,653 A | | 6/1988 | Junk et al. |
| 4,752,706 A | * | 6/1988 | Meszaros ..................... 310/80 |
| 4,752,853 A | | 6/1988 | Matsko et al. |
| 4,754,407 A | | 6/1988 | Nolan |
| 4,777,607 A | | 10/1988 | Maury et al. |
| 4,783,748 A | | 11/1988 | Swarztrauber et al. |
| 4,833,592 A | | 5/1989 | Yamanaka |
| 4,849,848 A | | 7/1989 | Ishii |
| 4,855,671 A | | 8/1989 | Fernandes |
| 4,859,886 A | * | 8/1989 | Tanaka et al. ................ 310/51 |
| 4,862,308 A | | 8/1989 | Udren |
| 4,964,058 A | | 10/1990 | Brown, Jr. |
| 4,979,122 A | | 12/1990 | Davis et al. |

(List continued on next page.)

Primary Examiner—Thanh Lam
(74) Attorney, Agent, or Firm—Trexler, Bushnell, Giangiorgi, Blackstone & Marr Ltd.

(57) ABSTRACT

A generator comprising a generator housing and a generator drive shaft including a power input shaft coupled to a drive member through a coupling arrangement, whereby in use the drive member is coupled to an output shaft of an associated engine. The coupling arrangement is arranged within the generator housing and comprises first and second coupling members and an insulator member interposed between the first and second coupling members. The coupling arrangement is configured such that the input shaft is electrically insulated from the drive member and, hence, from the engine output shaft, in use.

16 Claims, 2 Drawing Sheets

U.S. PATENT DOCUMENTS

Figure 1:
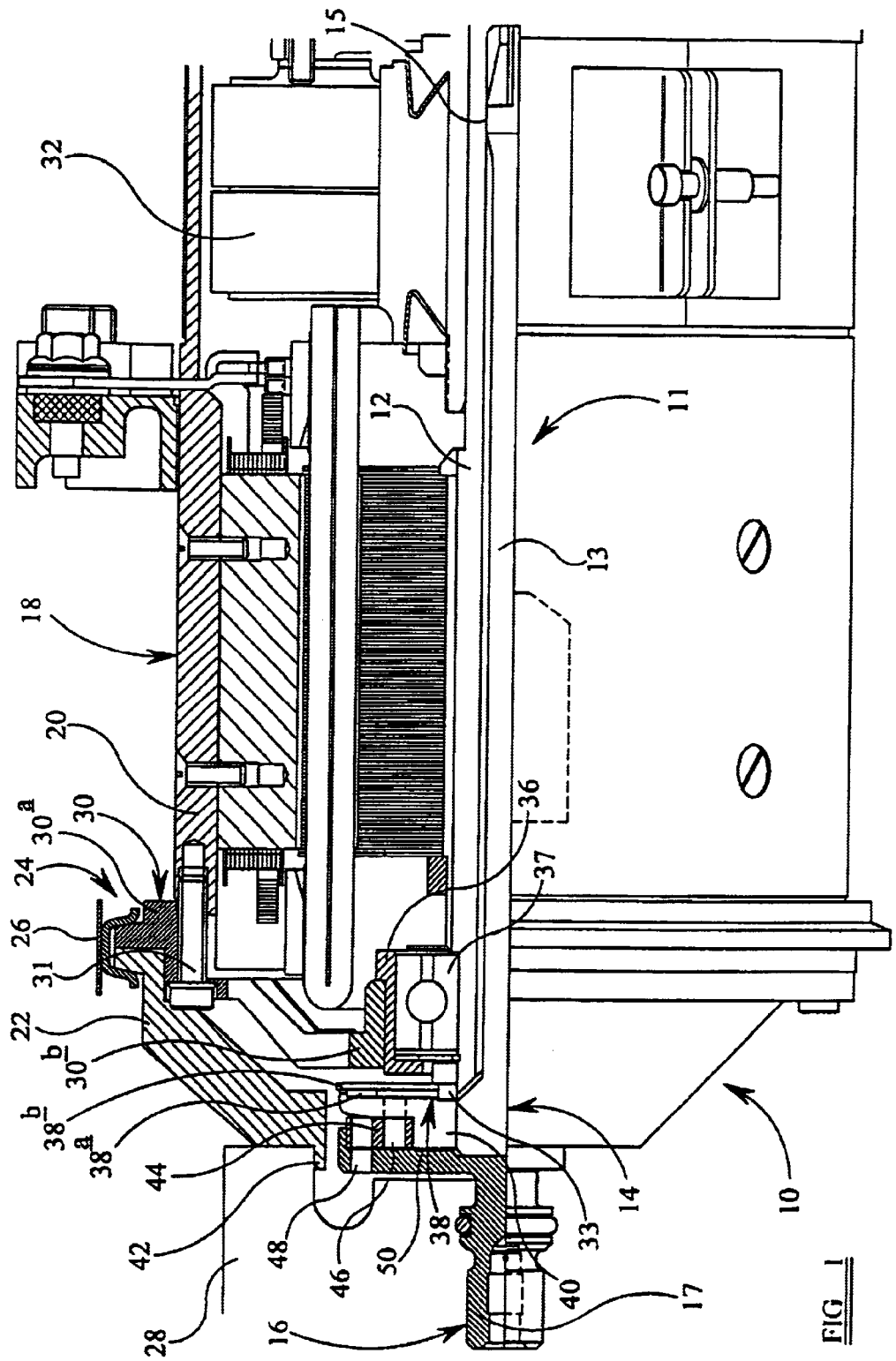

| | | | |
|---|---|---|---|
| 4,983,955 A | 1/1991 | Ham, Jr. et al. | |
| 4,996,646 A | 2/1991 | Farrington | |
| 5,006,741 A | * 4/1991 | Schott | 310/68 D |
| 5,053,735 A | 10/1991 | Ohishi et al. | |
| 5,060,166 A | 10/1991 | Engel et al. | |
| 5,101,191 A | 3/1992 | MacFadyen et al. | |
| 5,134,691 A | 7/1992 | Elms | |
| 5,136,195 A | * 8/1992 | Allen et al. | 310/68 D |
| 5,136,458 A | 8/1992 | Durivage, III | |
| 5,162,664 A | 11/1992 | Haun et al. | |
| 5,166,887 A | 11/1992 | Farrington et al. | |
| 5,170,310 A | 12/1992 | Studtmann et al. | |
| 5,179,376 A | 1/1993 | Pomatto | |
| 5,182,547 A | 1/1993 | Griffith | |
| 5,185,705 A | 2/1993 | Farrington | |
| 5,196,831 A | 3/1993 | Bscheider | |
| 5,214,560 A | 5/1993 | Jensen | |
| 5,216,621 A | 6/1993 | Dickens | |
| 5,225,994 A | 7/1993 | Arinobu et al. | |
| 5,231,565 A | 7/1993 | Bilas et al. | |
| 5,237,511 A | 8/1993 | Caird et al. | |
| 5,245,270 A | * 9/1993 | Akiyama | 322/4 |
| 5,247,454 A | 9/1993 | Farrington et al. | |
| 5,253,159 A | 10/1993 | Bilas et al. | |
| 5,272,438 A | 12/1993 | Stumme | |
| 5,301,121 A | 4/1994 | Garverick et al. | |
| 5,305,174 A | 4/1994 | Morita et al. | |
| 5,311,392 A | 5/1994 | Kinney et al. | |
| 5,323,307 A | 6/1994 | Wolf et al. | |
| 5,353,188 A | 10/1994 | Hatakeyama | |
| 5,361,184 A | 11/1994 | El-Sharkawi et al. | |
| 5,367,427 A | 11/1994 | Matsko et al. | |
| 5,369,356 A | 11/1994 | Kinney et al. | |
| 5,381,554 A | 1/1995 | Langer et al. | |
| 5,384,712 A | 1/1995 | Oravetz et al. | |
| 5,402,299 A | 3/1995 | Bellei | |
| 5,406,495 A | 4/1995 | Hill | |
| 5,414,635 A | 5/1995 | Ohta | |
| 5,420,799 A | 5/1995 | Peterson et al. | |
| 5,440,441 A | 8/1995 | Ahuja | |
| 5,481,149 A | * 1/1996 | Kambe et al. | 310/178 |
| 5,487,016 A | 1/1996 | Elms | |
| 5,490,086 A | 2/1996 | Leone et al. | |
| 5,530,738 A | 6/1996 | McEachern | |
| 5,534,782 A | 7/1996 | Nourse | |
| 5,534,833 A | 7/1996 | Castonguay et al. | |
| 5,544,065 A | 8/1996 | Engel et al. | |
| 5,559,719 A | 9/1996 | Johnson et al. | |
| 5,560,022 A | 9/1996 | Dunstan et al. | |
| 5,576,625 A | 11/1996 | Sukegawa et al. | |
| 5,581,471 A | 12/1996 | McEachern et al. | |
| 5,587,917 A | 12/1996 | Elms | |
| 5,596,473 A | 1/1997 | Johnson et al. | |
| 5,600,527 A | 2/1997 | Engel et al. | |
| 5,608,646 A | 3/1997 | Pomatto | |
| 5,613,798 A | 3/1997 | Braverman | |
| 5,619,392 A | 4/1997 | Bertsch et al. | |
| 5,627,716 A | 5/1997 | Lagree et al. | |
| 5,627,717 A | 5/1997 | Pein et al. | |
| 5,627,718 A | 5/1997 | Engel et al. | |
| 5,629,825 A | 5/1997 | Wallis et al. | |
| 5,631,798 A | 5/1997 | Seymour et al. | |
| 5,638,296 A | 6/1997 | Johnson et al. | |
| 5,650,936 A | 7/1997 | Loucks et al. | |
| 5,661,658 A | 8/1997 | Putt et al. | |
| 5,666,256 A | 9/1997 | Zavis et al. | |
| 5,670,923 A | 9/1997 | Gonzalez et al. | |
| 5,694,329 A | 12/1997 | Pomatto | |
| 5,696,695 A | 12/1997 | Ehlers et al. | |
| 5,719,738 A | 2/1998 | Singer et al. | |
| 5,734,576 A | 3/1998 | Klancher | |
| 5,736,847 A | 4/1998 | Van Doorn et al. | |
| 5,737,231 A | 4/1998 | Pyle et al. | |
| 5,742,513 A | 4/1998 | Bouhenguel et al. | |
| 5,751,524 A | 5/1998 | Swindler | |
| 5,754,033 A | 5/1998 | Thomson | |
| 5,754,440 A | 5/1998 | Cox et al. | |
| 5,784,237 A | 7/1998 | Velez | |
| 5,784,243 A | 7/1998 | Pollman et al. | |
| 5,786,699 A | 7/1998 | Sukegawa et al. | |
| 5,825,643 A | 10/1998 | Dvorak et al. | |
| 5,828,576 A | 10/1998 | Loucks et al. | |
| 5,828,983 A | 10/1998 | Lombardi | |
| 5,831,428 A | 11/1998 | Pyle et al. | |
| 5,867,385 A | 2/1999 | Brown et al. | |
| 5,872,722 A | 2/1999 | Oravetz et al. | |
| 5,890,097 A | 3/1999 | Cox | |
| 5,892,449 A | 4/1999 | Reid et al. | |
| 5,903,426 A | 5/1999 | Ehling | |
| 5,905,616 A | 5/1999 | Lyke | |
| 5,906,271 A | 5/1999 | Castonguay et al. | |
| 5,926,089 A | 7/1999 | Sekiguchi et al. | |
| 5,936,817 A | 8/1999 | Matsko et al. | |
| 5,946,210 A | 8/1999 | Montminy et al. | |
| 5,958,060 A | 9/1999 | Premerlani | |
| 5,963,457 A | 10/1999 | Kanoi et al. | |
| 5,973,481 A | 10/1999 | Thompson et al. | |
| 5,973,899 A | 10/1999 | Williams et al. | |
| 5,982,595 A | 11/1999 | Pozzuoli | |
| 5,982,596 A | 11/1999 | Spencer et al. | |
| 5,995,911 A | 11/1999 | Hart | |
| 6,005,757 A | 12/1999 | Shvach et al. | |
| 6,005,758 A | 12/1999 | Spencer et al. | |
| 6,018,451 A | 1/2000 | Lyke et al. | |
| 6,038,516 A | 3/2000 | Alexander et al. | |
| 6,054,661 A | 4/2000 | Castonguay et al. | |
| 6,055,145 A | 4/2000 | Lagree et al. | |
| 6,061,609 A | 5/2000 | Kanoi et al. | |
| 6,084,758 A | 7/2000 | Clarey et al. | |
| 6,139,327 A | 10/2000 | Callahan et al. | |
| 6,141,196 A | 10/2000 | Premerlani et al. | |
| 6,157,527 A | 12/2000 | Spencer et al. | |
| 6,167,329 A | 12/2000 | Engel et al. | |
| 6,175,780 B1 | 1/2001 | Engel | |
| 6,185,482 B1 | 2/2001 | Egolf et al. | |
| 6,185,508 B1 | 2/2001 | Van Doorn et al. | |
| 6,186,842 B1 | 2/2001 | Hirschbold et al. | |
| 6,195,243 B1 | 2/2001 | Spencer et al. | |
| 6,198,402 B1 | 3/2001 | Hasegawa et al. | |
| 6,212,049 B1 | 4/2001 | Spencer et al. | |
| 6,233,128 B1 | 5/2001 | Spencer et al. | |
| 6,236,949 B1 | 5/2001 | Hart | |
| 6,242,703 B1 | 6/2001 | Castonguay et al. | |
| 6,268,991 B1 | 7/2001 | Criniti et al. | |
| 6,288,882 B1 | 9/2001 | Criniti et al. | |
| 6,289,267 B1 | 9/2001 | Alexander et al. | |
| 6,292,340 B1 | 9/2001 | O'Regan et al. | |
| 6,292,717 B1 | 9/2001 | Alexander et al. | |
| 6,292,901 B1 | 9/2001 | Lys et al. | |
| 6,297,939 B1 | 10/2001 | Bilac et al. | |
| 6,313,975 B1 | 11/2001 | Dunne et al. | |
| 6,341,054 B1 | 1/2002 | Walder et al. | |
| 6,356,422 B1 | 3/2002 | Bilac et al. | |
| 6,356,849 B1 | 3/2002 | Jaffe | |
| 6,369,996 B1 | 4/2002 | Bo | |
| 6,377,051 B1 | 4/2002 | Tyner et al. | |
| 6,385,022 B1 | 5/2002 | Kulidjian et al. | |
| 6,396,279 B1 | 5/2002 | Gruenert | |
| 6,397,155 B1 | 5/2002 | Przydatek et al. | |
| 6,405,104 B1 | 6/2002 | Dougherty | |
| 6,406,328 B1 | 6/2002 | Attarian et al. | |

| | | | | | | |
|---|---|---|---|---|---|---|
| 6,411,865 B1 | 6/2002 | Qin et al. | | 2002/0094799 A1 | 7/2002 | Elliott et al. |
| 6,459,997 B1 | 10/2002 | Andersen | | 2002/0107615 A1 | 8/2002 | Bjorklund |
| 6,496,342 B1 | 12/2002 | Horvath et al. | | 2002/0108065 A1 | 8/2002 | Mares |
| 2001/0010032 A1 | 7/2001 | Ehlers et al. | | 2002/0109722 A1 | 8/2002 | Rogers et al. |
| 2001/0032025 A1 | 10/2001 | Lenz et al. | | 2002/0116092 A1 | 8/2002 | Hamamatsu et al. |
| 2001/0044588 A1 | 11/2001 | Mault | | 2002/0124011 A1 | 9/2002 | Baxter et al. |
| 2001/0048354 A1 | 12/2001 | Douville et al. | | 2002/0146076 A1 | 10/2002 | Lee |
| 2001/0055965 A1 | 12/2001 | Delp et al. | | 2002/0146083 A1 | 10/2002 | Lee et al. |
| 2002/0010518 A1 | 1/2002 | Reid et al. | | 2002/0147503 A1 | 10/2002 | Osburn, III |
| 2002/0032535 A1 | 3/2002 | Alexander et al. | | 2002/0159402 A1 | 10/2002 | Binder |
| 2002/0034086 A1 | 3/2002 | Scoggins et al. | | 2002/0162014 A1 | 10/2002 | Przydatek et al. |
| 2002/0045992 A1 | 4/2002 | Shincovich et al. | | 2002/0165677 A1 | 11/2002 | Lightbody et al. |
| 2002/0059401 A1 | 5/2002 | Austin | | 2002/0181174 A1 | 12/2002 | Bilac et al. |
| 2002/0063635 A1 | 5/2002 | Shincovich | | 2002/0193888 A1 | 12/2002 | Wewalaarachchi et al. |
| 2002/0064010 A1 | 5/2002 | Nelson et al. | | | | |
| 2002/0091949 A1 | 7/2002 | Ykema | | * cited by examiner | | |

GENERATOR

The invention relates to a generator such as is often used, for example, on a turbine engine. In particular, but not exclusively, the invention relates to a starter/generator suitable for use in initiating start-up of a turbine engine.

It is well known to use both AC and DC generators as starters for motors and engines. For example, generators are commonly used as engine starters on small aircraft engines, such as gas turbine engines, using either battery or ground-source power. The generator armature is supplied with electrical current and the generator develops substantial torque to begin turning of the engine. After the engine has been started, the generator is typically used as an electrical power source for the aircraft.

The starter/generator includes a power drive shaft having a drive end spline which is adapted to be coupled to an engine drive shaft, in use, to effect engine start-up. It has been recognised that, in the event of a system fault, the potential exists for electrical leakage current to flow through the power drive shaft to the engine drive shaft. Such current leakage is undesirable and one proposed means for avoiding this problem is to provide an insulator arrangement on the engine drive shaft within the associated engine gearbox. A disadvantage of this, however, is that the accommodation space available for an additional insulating arrangement within the engine gearbox is limited. It is also difficult to modify existing engines to include this component.

It is an object of the present invention to provide a generator suitable for use as a starter/generator on a gas turbine engine which alleviates or removes the aforementioned problems.

According to the present invention, there is provided a generator comprising a generator housing, a generator drive shaft including a power input shaft coupled to a drive member through a coupling arrangement, whereby in use the drive member is coupled to an output shaft of an associated engine, the coupling arrangement being arranged within the generator housing and comprising first and second coupling members and an insulator member interposed between the first and second coupling members and arranged such that the input shaft is electrically insulated from the drive member, and hence from the engine output shaft, in use.

In a preferred embodiment, the generator takes the form of a starter/generator for use on a turbine engine, having a starter or start up mode of operation in which drive is transmitted from the power input shaft to the drive member and, hence, to the engine, and a generator mode of operation in which drive is transmitted from the drive member to the input shaft. It will be appreciated, however, that the generator may be used in other applications, in which electrical insulation of the generator drive shaft and the driven output shaft is desirable.

As the starter/generator is provided with an electrically insulating member between the first and second coupling members, through which drive is transmitted from the power input shaft of the generator drive shaft to the drive member associated with the engine output shaft during the start up mode of operation and through which drive is transmitted from the drive member to the input shaft during the generator mode of operation, the risk of electrical current leakage from the generator drive shaft to the output shaft of the associated engine is substantially avoided. Furthermore, as the insulator member is arranged inside the generator housing, the need for an external insulator arrangement within the engine gearbox can be avoided. The insulator member can also be retrofitted to existing generators with relatively little modification of existing generator parts.

Preferably, the generator takes the form of a DC generator, but it may alternatively take the form of an AC generator.

Preferably, the drive member includes a spline arrangement through which the drive member is coupled to the output shaft of the associated engine, and hence, by virtue of the coupling arrangement, by which the power input shaft is coupled to the engine output shaft. The second coupling member may form an integral part of the drive member, or alternatively may be a separate component carried by the drive member. For example, the drive member may take the form of a separate adapter member carried by the drive member.

The coupling arrangement preferably includes securing means for securing the first and second coupling members and the insulator member together. The securing means may include one or more securing element.

Preferably, each of the first and second coupling members and the insulator member is provided with an aperture or drilling within which a securing element is received, at least in part.

In one embodiment of the invention, the insulator member is provided with first and second apertures or drillings, a first securing element being received within the first aperture and a corresponding aperture or drilling provided in the first coupling member, a second securing element being received within the second aperture provided in the insulator member and a further corresponding aperture or drilling provided in the second coupling member. The first and second apertures provided in the insulator member are arranged such that, when the first and second securing elements are received within their respective apertures, the first and second securing elements are electrically insulated from one another.

In an alternative embodiment of the invention, the securing means includes a single securing element which extends, at least in part, through respective apertures or drillings provided in the first and second coupling members and within the insulator member.

In this embodiment, the coupling arrangement preferably further comprises further insulator means for electrically insulating the securing element from the first and second coupling members.

The further insulating means may comprise an insulating sleeve received, at least in part, within the apertures provided in the first and second coupling members and in the insulator member.

The first coupling member may take the form of a first damper plate forming part of a damping arrangement which serves to prevent transmission of vibrations within the generator to the engine shaft.

The coupling arrangement may further comprise a second damper plate and a friction ring arranged between the first and second damper plates.

Preferably, one or more of the securing elements takes the form of a bolt.

Figure 2:
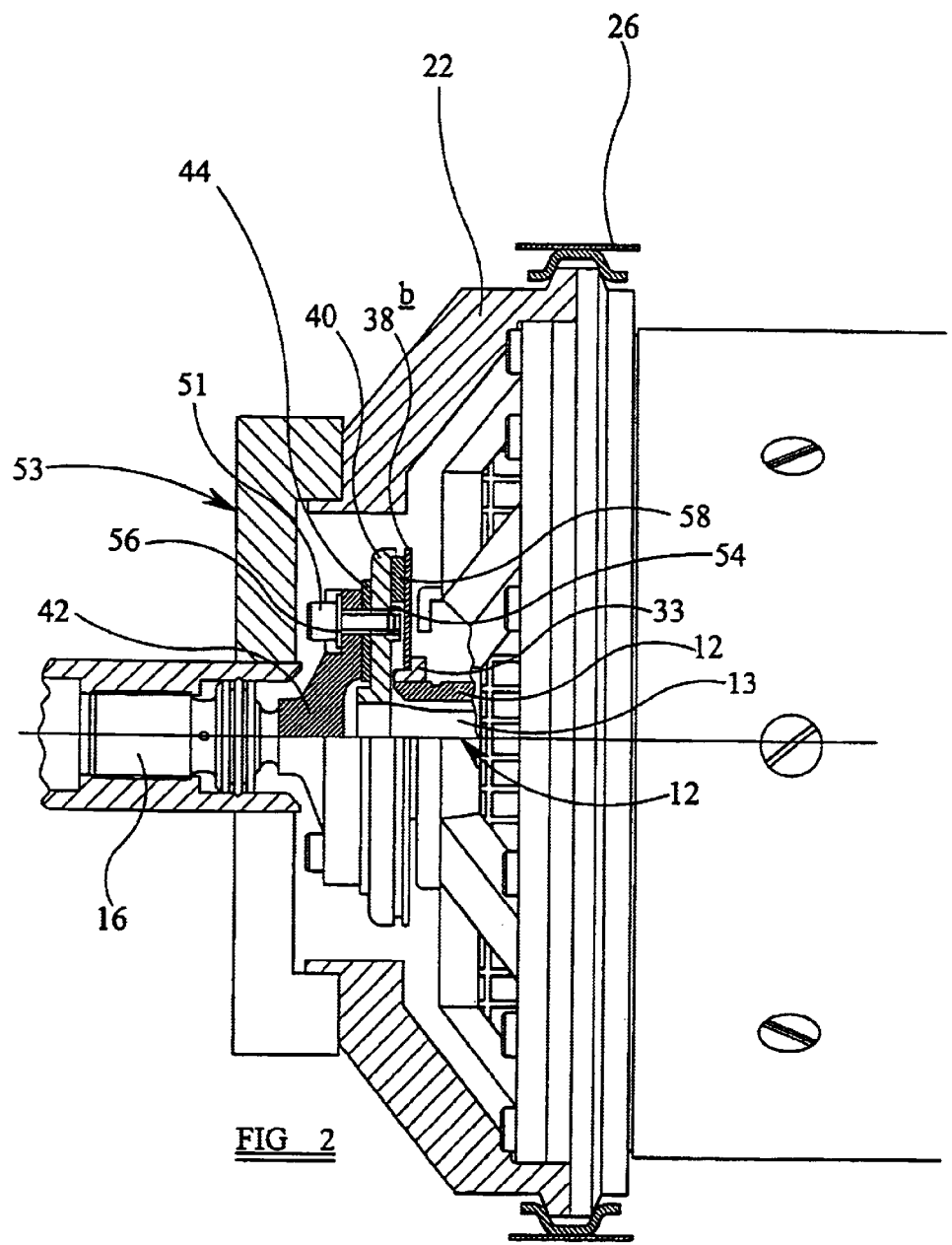

The invention will be described, by way of example only, with reference to the accompanying drawings in which:

FIG. 1 is a schematic view in partial longitudinal cross-section of a generator in accordance with a first embodiment of the present invention, and FIG. 2 is a cross-sectional view of a part of an alternative embodiment of the generator of the present invention.

Referring to FIG. 1, there is shown a generator, referred to generally as 10, in the form of a starter/generator, suitable for use on a turbine engine. The starter/generator 10 includes a generator drive shaft, referred to generally as 11, which extends along the longitudinal drive axis 14 of the starter/generator 10. The drive shaft 11 includes a power input shaft 13 which extends through an outer armature shaft 12. The input shaft 13 is coupled to a drive member, referred to generally as 17, through a coupling arrangement, as will be described in further detail below. The drive member 17 is provided with a spline arrangement 16, suitably adapted for being coupled to an output shaft (not shown) of the associated engine. Typically, the spline 16 is mounted on the auxiliary drive pad of the associated engine. At the end of the drive shaft 11 remote from the spline 16, the outer shaft 12 is coupled to the input shaft 13 through a spline arrangement 15, this being the only point of connection between the outer and inner shafts 12, 13.

The input shaft 13 extends through the outer shaft 12, and both shafts 12, 13 extend through a generator housing assembly 18. The generator housing assembly 18 comprises a cylindrical housing member 20 and a front end cover member 22, commonly referred to as a 'Quick Attach Detach' (QAD) mounting assembly. The cylindrical housing member 20 carries a flanged member 30 comprising first and second flanges 30a, 30b, the first flange 30a being provided with a drilling or aperture through which a bolt 31 extends into a corresponding drilling or aperture provided in the cylindrical housing member 20 so as to secure the cylindrical housing member 20 to the flanged member 30. The first flange 30a is secured to a V-ring fixing band 26 forming part of the aircraft housing in an appropriate manner, the V-ring providing a convenient means of securing the first flange 30a to the end cover member 22. The front end cover member 22 is secured to a gearbox housing 28 (only a part of which is shown) for the engine gearbox by means of bolts (not shown), the spline 16 being arranged to extend into the gearbox housing 28 and being adapted to be coupled to the engine shaft. The outer shaft 12 carries a roller bearing arrangement 37, which is arranged to permit relative rotation between the bearing and the second flange 30b. A removable liner 36 for the bearing 37 is interposed between the bearing arrangement 37 and the second flange 30b, and conveniently may be integrally formed with the flanged member 30.

In the embodiment shown in FIG. 1, the starter/generator 10 takes the form of a DC generator which includes a brush and commutator assembly 32 mounted within the generator housing assembly 18 at the rear end (i.e. to the right in the illustration shown) of the starter/generator 10 in a conventional manner. In use, rotational movement is imparted to the radially inner, input shaft 13 and, hence, due to the spline connection, to the outer shaft 12 also.

The input shaft 13 is centred within the outer armature shaft 12 by means of a damping arrangement 38, including first and second damping plates 38a, 38b respectively, and a first coupling member 40 which is in abutment with a surface of the first damping plate 38a. The first and second damping plates 38a, 38b are carried by a carrier member 33 mounted upon the outer armature shaft 12. The first coupling member 40 is carried by the input shaft 13 and forms part of the coupling arrangement which couples the input shaft 13 to the drive member 17 and, hence, couples the input shaft 13 to the engine output shaft. The coupling arrangement also includes a second, flanged coupling member 42, which forms part of the drive member 17. Typically, the first and second coupling members 40, 42 are formed from steel. The provision of the damping arrangement 38 ensures any undesirable vibratory movement of the input shaft 13 is damped, so as to limit the transmission of vibratory movement to the drive member 17 and, hence, to the engine gearbox and/or the engine shaft.

It will be appreciated that, although the second coupling member 42 in FIG. 1 is the same part as the drive member 17, the second coupling member 42 may alternatively be a separate part carried by or mounted upon the drive member 17.

An insulator member 44 is interposed between the first and second coupling members 40, 42. The first coupling member 40 is provided with a first drilling or aperture which is substantially axially aligned with a corresponding drilling or aperture provided in the insulator member 44. The insulator member 44 is also provided with a further aperture, radially spaced from the first aperture and substantially axially aligned with a further corresponding aperture or drilling provided in the second coupling member 42. First and second securing elements 46, 48, typically in the form of bolts, are received within the axially aligned aperture pairs and appropriate nuts (not shown) are provided to couple the first and second coupling members 40, 42 and the insulating member 44 together. The first coupling member 40, the second coupling member 42 and the insulator member 44 therefore provide a coupling arrangement through which, when in a generator mode of operation, drive is transmitted from the drive member 17 within the gear box housing 28 to the power input shaft 13.

It will be appreciated that, when the starter/generator is in a start up or starter mode of operation, the drive direction is reversed and drive is transmitted from the power input shaft 13 to the drive member 17 and, hence, to the engine shaft.

A narrow clearance 50 is defined between the first and second coupling members 40, 42 radially inward of the insulator member 44 such that there is no direct contact between the end surface of the inner shaft 13 and the second coupling member 42, nor between the first and second coupling members 40, 42.

It will be appreciated that the provision of the insulator member 44 between the first and second coupling members 40, 42 ensures the power input end of the generator drive shaft 11 is substantially electrically insulated from the driven end spline 16, thereby ensuring the generator drive shaft 11 is substantially electrically insulated from the engine shaft when the drive member 17 is coupled thereto. In the event that a failure or fault occurs within the starter/generator 10 to cause an electrical current to flow along the power input shaft 13 of the drive shaft 11, the presence of the insulator member 44 therefore prevents any undesirable leakage current flow to the engine shaft.

As the insulator member 44 is provided internally of the generator housing assembly 18, the need for an external insulating arrangement on the engine shaft within the engine gear box housing 28 is removed. Moreover, the retro-fitting of the insulator member 44 between the first and second coupling members 40, 42 to existing starter/generators can be achieved easily with relatively little modification to existing components.

Typically, the insulator member 44 may be formed from the electrically insulating material Vespel®. It will be appreciated, however, that any electrically insulating material may be used, providing it also has suitable mechanical and thermal properties.

FIG. 2 shows an alternative embodiment of the invention in which similar parts to those shown in FIG. 1 are denoted with like reference numerals and only differing parts to those shown in FIG. 1 will be described in further detail hereinafter. FIG. 2 shows a gear box housing flange 53 forming part of the gear box housing 28 to which the front end cover member 22 of the generator housing assembly 20 is secured.

In this embodiment, the second coupling member 42 takes the form of an adapter member which is carried by the driven end spline 16. The first and second coupling members 40, 42 and the insulator member 44 are each provided with only a single aperture or drilling through which the shaft of a single securing element 51, in the form of a bolt, extends. The bolt 51 provides the function of securing the first and second coupling members 40, 42 together. The bolt 51 is typically formed from an electrically conducting material and it is therefore necessary to provide additional insulating means to insulate the bolt from the first and second coupling members 40, 42. For this purpose, an insulating sleeve member 54 is received within the apertures provided in the coupling members 40, 42 and the insulator member 44 and the shaft of the bolt 51 is received within the sleeve 54. Additionally, an insulating washer 56 is interposed between the head of the bolt 51 and a surface of the second coupling member 42 remote from the insulator member 44.

The embodiment shown in FIG. 2 also differs from that shown in FIG. 1 in that the first coupling member 40 also forms the first damping plate 38a of the damping arrangement 38. A friction ring 58 is interposed between the first coupling member 40 and the rear damping plate 38b mounted upon the carrier member 33.

The embodiment shown in FIG. 2 provides the same advantage as that shown in FIG. 1 in that the input shaft 13 of the generator drive shaft 11 is electrically insulated from the drive member 15 by means of the insulator member 44, the insulating sleeve member 54 and the insulating washer 56, thereby preventing any unwanted current leakage flow to the engine gearbox and/or engine shaft. Although only a single securing element in the form of the bolt 51 is required, the embodiment shown in FIG. 2 may be less preferable to that shown in FIG. 1 as it is necessary to provide additional insulating means, in the form of the insulating sleeve member 54 and the insulating washer member 56, for insulating the head and shaft of the bolt 51 from the first and second coupling members 40, 42.

Although the invention has been described as a starter/generator suitable for use on a turbine engine, it will be appreciated that the generator may be used in any application in which it is desirable to insulate the generator drive shaft from the output shaft to which it is coupled, in use, and particularly in applications for which the provision of an insulating arrangement externally of the generator housing assembly 20 is difficult to accommodate.

It will be appreciated that the generator in accordance with the present invention need not take the form of a DC generator, as illustrated in FIG. 1, but may take the form of an AC generator including a stator assembly.

It will further be appreciated that the first and second coupling members 40, 42 and the insulator member 44 need not be secured together by means of a nut and bolt arrangement, and alternative fixing or securing means, for example a screw thread or clamping arrangement, may be used.

In a further alternative embodiment of the invention, the drive shaft 11 need not be of the type having a hollow, outer shaft 12 through which an inner, input shaft 13 extends, but may be of substantially solid form. The provision of the damping arrangement 38a, 38b, may not be necessary in starter/generators having a solid generator drive shaft 11.

We claim:

1. A generator comprising a generator housing, a generator drive shaft including a power input shaft coupled to a drive member through a coupling arrangement, whereby in use the drive member is coupled to an output shaft of an associated engine, the coupling arrangement being arranged within the generator housing and comprising first and second coupling members and an insulator member interposed between the first and second coupling members and arranged such that the input shaft is electrically insulated from the drive member and, hence, from the engine output shaft, in use.

2. A generator as claimed in claim 1, wherein the generator takes the form of a starter/generator for a turbine engine.

3. A generator as claimed in claim 1, wherein the drive member includes a spline arrangement through which the drive member is coupled to the engine shaft, in use.

4. A generator as claimed in claim 1, wherein the coupling arrangement includes a securing arrangement for securing the first and second coupling members and the insulator member together.

5. A generator as claimed in claim 4, wherein each of the first and second coupling members and the insulator member is provided with an aperture or drilling within which a securing element is received, at least in part.

6. A generator as claimed in claim 5, wherein the insulator member is provided with first and second apertures or drillings, a first securing element being received within the first aperture and a corresponding aperture or drilling provided in the first coupling member, a second securing element being received within the second aperture provided in the insulator member and a further corresponding aperture or drilling provided in the second coupling member, the first and second apertures being arranged such that, when the first and second securing elements are received within their respective apertures, the first and second securing elements are electrically insulated from one another.

7. A generator as claimed in claim 5, including a single securing element which extends, at least in part, through the apertures provided in the first and second coupling members and in the insulator member.

8. A generator as claimed in claim 7, wherein the coupling arrangement further comprises an insulator arrangement for electrically insulating the securing element from the first and second coupling members.

9. A generator as claimed in claim 7, wherein the insulator arrangement comprises an insulating sleeve received, at least in part, within respective apertures provided in the first and second coupling members and in the insulator member.

10. A generator as claimed in claim 1, wherein the first coupling member takes the form of a first damper plate forming part of a damping arrangement which serves to limit transmission of vibrations within the generator to the engine shaft.

11. A generator as claimed in claim 10, wherein the coupling arrangement further comprises a second damper plate and a friction ring arranged between the first and second damper plates.

12. A generator as claimed in claim 1, wherein the second coupling member forms an integral part of the drive member.

13. A generator as claimed in claim 1, wherein the second coupling member is carried by or mounted upon the drive member.

14. A generator as claimed in claim 5, wherein one or more of the securing elements takes the form of a bolt.

15. A generator as claimed in claim 1, wherein the drive shaft includes an outer armature shaft forming part of a DC motor, and wherein the input shaft extends through the outer armature shaft, the inner shaft and the outer shaft being coupled together through a further spline arrangement at an end of the drive shaft remote from the drive member.

16. A starter/generator for a turbine engine, the starter/generator comprising a generator drive shaft including a power input shaft coupled to a drive member through a coupling arrangement, whereby in use the drive member is coupled to an output shaft of an associated engine, the coupling arrangement being arranged within the generator housing and comprising first and second coupling members and an insulator member interposed between the first and second coupling members and arranged such that the input shaft is electrically insulated from the drive member and, hence, from the engine output shaft, the starter/generator further comprising a securing arrangement for securing the first and second coupling members and the insulator member together.

* * * * *